(12) United States Patent
Van Antwerp et al.

(10) Patent No.: US 11,966,493 B2
(45) Date of Patent: *Apr. 23, 2024

(54) USER IDENTIFICATION SYSTEM AND METHOD FOR FRAUD DETECTION

(71) Applicant: Comcast Cable Communications, LLC, Philadelphia, PA (US)

(72) Inventors: Ryan Van Antwerp, Glen Mills, PA (US); James Bradley Hein, King of Prussia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,232

(22) Filed: Nov. 16, 2021

(65) Prior Publication Data

US 2022/0075895 A1    Mar. 10, 2022

Related U.S. Application Data

(63) Continuation of application No. 16/218,687, filed on Dec. 13, 2018, now Pat. No. 11,200,336.

(51) Int. Cl.
| | |
|---|---|
| *G06F 21/62* | (2013.01) |
| *G06F 21/31* | (2013.01) |
| *G06F 40/253* | (2020.01) |
| *G06N 20/00* | (2019.01) |
| *H04L 9/40* | (2022.01) |

(52) U.S. Cl.
CPC ........ *G06F 21/6245* (2013.01); *G06F 21/316* (2013.01); *G06F 40/253* (2020.01); *G06N 20/00* (2019.01); *H04L 63/102* (2013.01); *H04L 63/1408* (2013.01)

(58) Field of Classification Search
CPC .. G06F 21/6245; G06F 21/316; G06F 40/253; G06N 20/00; G06N 20/10; H04L 63/102; H04L 63/1408
See application file for complete search history.

(56) References Cited

U.S. PATENT DOCUMENTS

| | | | |
|---|---|---|---|
| 2008/0070205 A1 | 3/2008 | Amick et al. | |
| 2008/0084972 A1* | 4/2008 | Burke | H04L 63/126 379/88.02 |
| 2010/0179813 A1 | 7/2010 | Summerfield et al. | |
| 2013/0232159 A1 | 9/2013 | Daya et al. | |
| 2014/0108799 A1* | 4/2014 | Wang | H04W 12/08 713/168 |
| 2014/0295384 A1 | 10/2014 | Nielson et al. | |
| 2015/0248619 A1 | 9/2015 | Myslinski | |
| 2017/0118209 A1 | 4/2017 | Saravanan | |
| 2017/0155611 A1 | 6/2017 | Ashoori et al. | |
| 2017/0169079 A1 | 6/2017 | Monni | |
| 2017/0364967 A1 | 12/2017 | Parikh et al. | |
| 2018/0032612 A1 | 2/2018 | Kariman | |
| 2018/0082683 A1 | 3/2018 | Chen et al. | |

(Continued)

*Primary Examiner* — Cheng-Feng Huang
(74) *Attorney, Agent, or Firm* — Banner & Witcoff, Ltd.

(57) ABSTRACT

Methods, systems, and apparatuses are described for identifying potential identity fraud by tracking a user's typical communication patterns. If a new communication is received from someone who purports to be a trusted user, but the communication exhibits communication traits that are not typical for the user, additional identity fraud prevention steps may be taken.

24 Claims, 9 Drawing Sheets

(56) References Cited

U.S. PATENT DOCUMENTS

| | | |
|---|---|---|
| 2018/0359233 A1 | 12/2018 | Alexander et al. |
| 2019/0050388 A1* | 2/2019 | Eugster ................ G06F 40/253 |
| 2019/0065463 A1 | 2/2019 | Ukrainets et al. |
| 2019/0080018 A1 | 3/2019 | Pilkington et al. |
| 2019/0326000 A1 | 10/2019 | Bao et al. |
| 2019/0361910 A1 | 11/2019 | Rogynskyy et al. |
| 2020/0106885 A1 | 4/2020 | Koster et al. |

* cited by examiner

USER IDENTIFICATION SYSTEM AND METHOD FOR FRAUD DETECTION

CROSS-REFERENCE TO RELATED APPLICATIONS

This application is a continuation of U.S. patent application Ser. No. 16/218,687, filed Dec. 13, 2018, which is incorporated by reference in its entirety herein for all purpose.

BACKGROUND

Identity theft is a common problem in the digital age, particularly when identification of a person occurs electronically. Due to increasing data breaches, information that was once thought secure to verify identity, such as social security numbers, birthdays, and personal security questions, may be insufficient to protect service provider accounts from takeovers by identity thieves or cybercriminals.

SUMMARY

The following summary presents a simplified summary of certain features. The summary is not an extensive overview and is not intended to identify key or critical elements.

Methods, systems, and apparatuses are described for creating one or more communication profiles, such as linguistic and other expression profiles, of user's communications with a system. Such profiles may be used during a communication session with the user to monitor the session for potential identity fraud. A model may be developed and trained based on a known corpus of text, audio, or other data interactions between a user and a service. During a communication session with the service, e.g., a service administered by a provider, the models may be used to monitor the text-based, audio-based, or other types of interactions provided to the communication session system by the user and a probability of identity fraud of the user may be generated.

These and other features are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
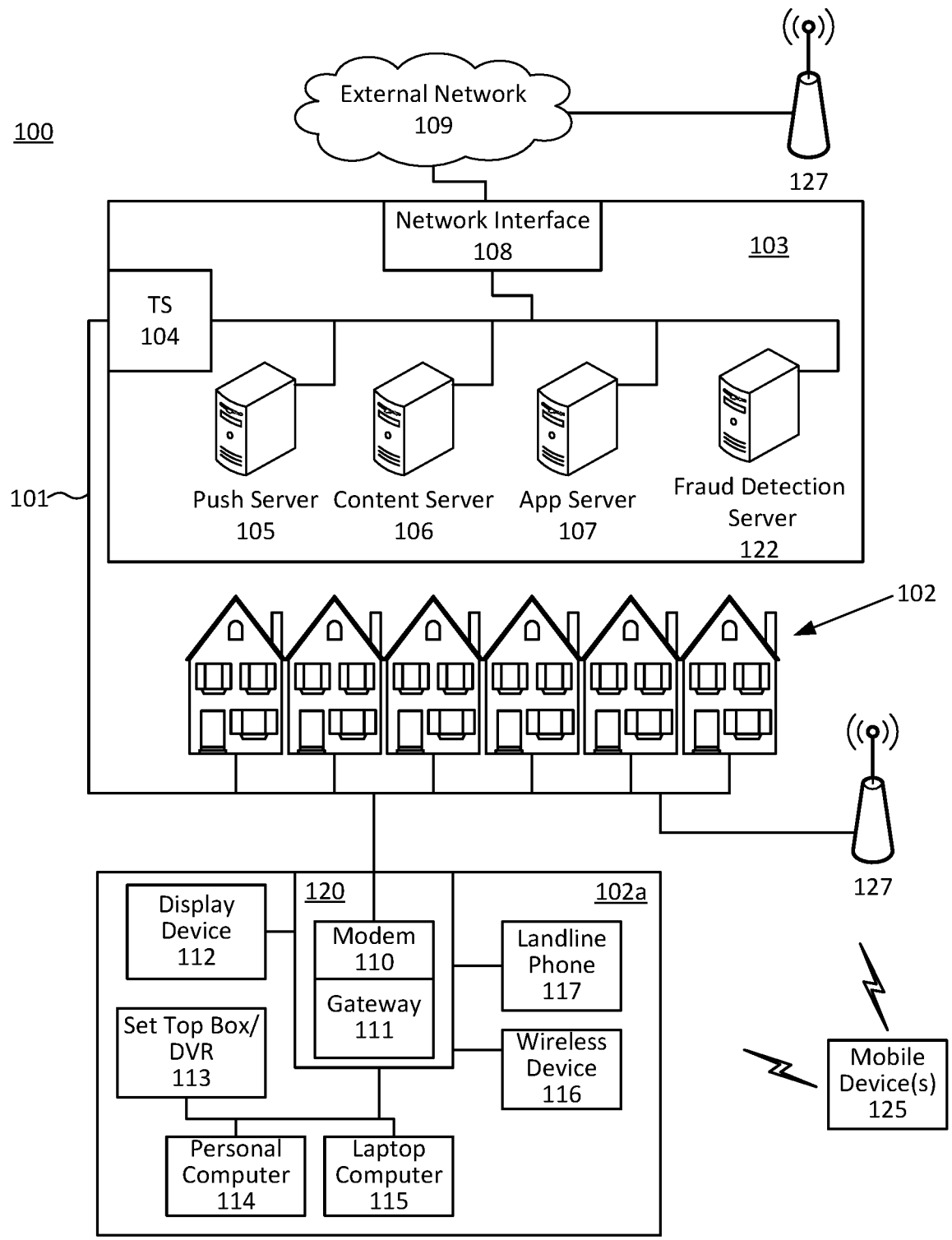
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the fraud detection server 122 (described below), additional push, content, and/or application servers, and/or other types of servers. Although shown separately, the push server 105, the content server 106, the application server 107, the fraud detection server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Through the service provider network 100, any number of services or products may be provided to users of the network. Voice and other telephony services may be provided to a user's mobile device 125, multimedia content (such as television, VOD, images, etc.) may be provided to a user's display device (such as a television 112, laptop computer 115, personal computer 114, etc.), computing files and data may be provided to computing devices, and the like. To provide such services, users or other users may communicate with the service provider network for any number of administrative procedures, such as initiating a service, altering a service agreement between the user and the service provider, requesting an additional service, paying a bill associated with the service, and the like. As explained in more detail below, the user may initiate such a communication session with the network 100 to interact with the services provided by the network by contacting the service provider network. A user may use the mobile device 125, landline phone 117, laptop computer 115, or personal computer 114, of the network 100 to communicate with the network during a communication session. Communication devices not of the network 100 may also be used to communicate with the service provider. The fraud detection server 122 may be used during the communication session to monitor interactions between the user device and the network 100 device and provide an indication of a potential identity fraud during the session, as described in more detail below.

Figure 2:
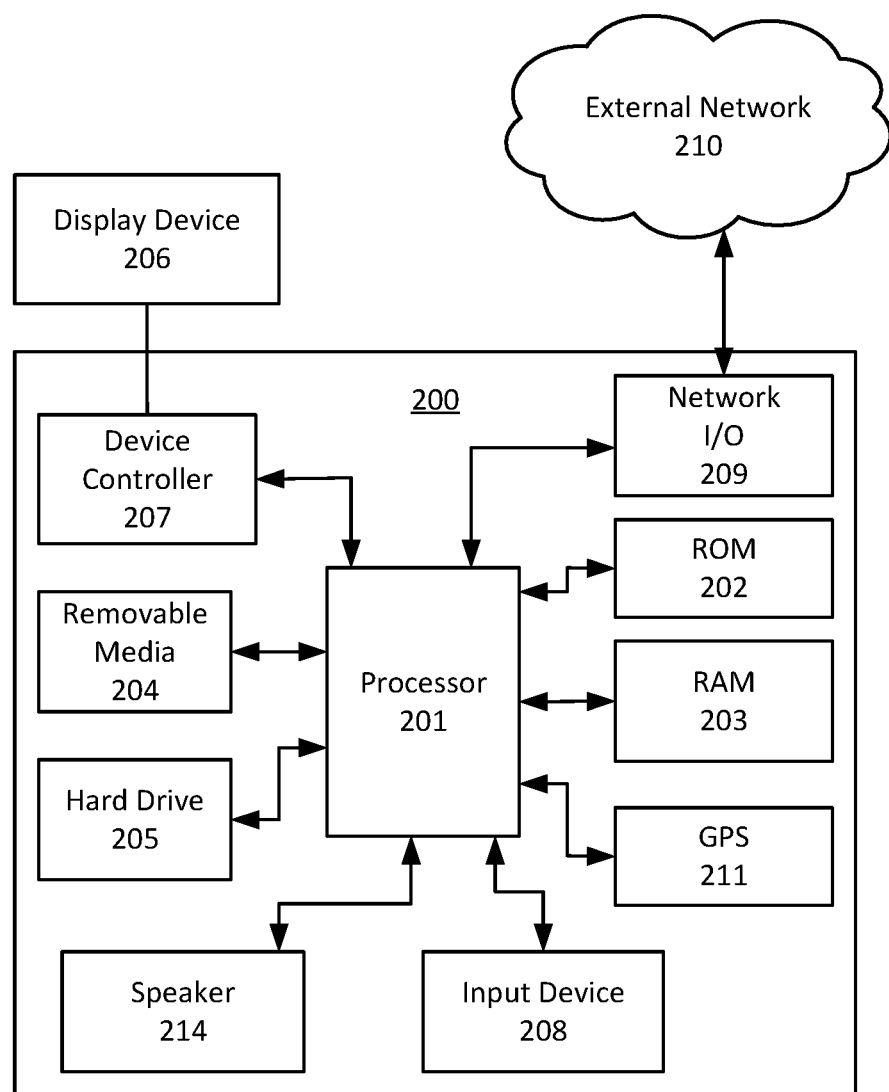
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., the fraud detection server 122 to obtain user identification models and monitor interactions during a communication session). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The communication device 200 may comprise a location-detecting device, such as a global positioning system (GPS) microprocessor 211, which may be configured to receive and process global positioning signals and determine, with possible assistance from an external server and antenna, a geographic position of the communication device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
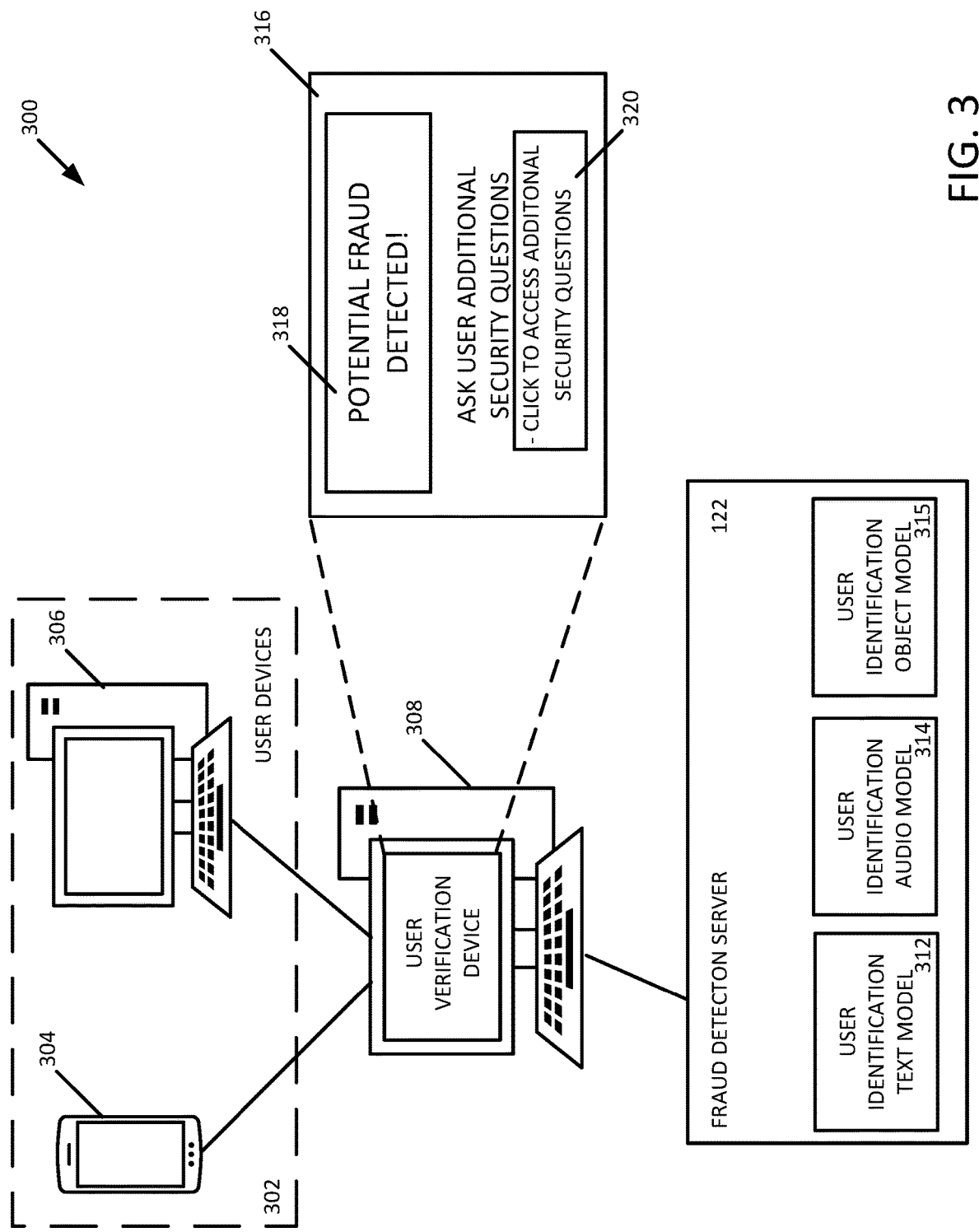
FIG. 3 is a diagram illustrating a system for applying user identification models to communication session interactions to detect potential identity fraud during the session.

As mentioned above, the network 100 may provide services to users of the network. As part of receiving the services, a user may interact with the network 100 or a network administrator through a communication device to initiate or alter the services provided by the network to the user (e.g., a user may call their local cable service provider to request a change to their account information, request additional services from the network, ask questions about billing or pay an outstanding bill, etc.). FIG. 3 is a diagram illustrating a system 300 for applying user identification models 312-315 to communication session interactions between a user and a network to detect potential identity fraud during the session. During such communication sessions, the user may use a communication device to communicate with one or more components of the network 100, such as a smart phone 304 or a computing device 306 to provide audio communications and/or text-based communications. The user devices 302 transmit the user communications to a user identity verification device 308 or other communication device of the network or network administrator. Queries and statements in the form of text-based or audio-based messages may be exchanged between the user identity verification device 308 and the user devices 302. Through the communication session, alterations to services provided by the network 100 may be implemented, questions concerning the services provided by the network may be answered, additional services may be installed on the network for use by the user, etc.

During the communication session, identification of the user by the network 100 may occur such that the alterations to the services provided to the user are applied to the correct user of the network 100. In addition to the user providing identifying information to the user identity verification device 308 through the user devices 302 (such as a user identification/password pair, social security number, answers to personal questions, etc.), the network 100 may analyze the communications transmitted between the user identity verification device 308 and the user devices 302 during the communication session through one or more user communication identification profiles of the user to detect potential identity fraud. The user communication identification profiles include, for example, linguistic properties or tendencies of the user in communicating with the network, such as average sentence length, language and other types of words used, pauses in verbal speech, length and placement of white space in written communications, sentence structure, etc. Additional linguistic properties of users stored in the communication identification profiles are discussed in more detail below. The user communication identification profiles or models may be trained based on interactions with the user of the network and used during a later communication session to aid the network in identifying potential identity fraud of a user. For example, a criminal may steal or otherwise unlawfully obtain the personal information, such as a username and password, home address, etc., of a user to the network 100 and attempt to impersonate the user to the network 100 to obtain funds attributed to the user or to receive free services from the network. During the communication with the impersonator, the network 100 may use the user identification models associated with the impersonated user and potentially determine that identify fraud is being perpetrated by the criminal.

To address the potential identity fraud situation, a model may be developed and trained based on a known corpus of text interactions or audio interactions from a user to the network 100. For example, communications in text may be obtained from the user and linguistic features of the text, such as word choices, acronyms used, use of emojis or other symbols, white space within the text, etc. For audio interactions, linguistic feature such as lengths and number of pauses of the user, vocabulary used, average speaking time to respond to a question, etc. may be obtained from the user. These linguistic features may be used to train or create one or more user identification models that compare received text or audio features to those used to train the models. During a communication session with the service provider, interactions between the user devices 302 and the user identity verification device 308 may be provided to the models to monitor the text-based or audio-based interactions provided to the communication session system. An estimated probability of the user of the user devices 302 impersonating the user to the network 100 may be provided by the model such that additional security protocols or other measures may be initiated by the network or network administrator to verify that the user of the user devices is the user associated with the identification information provided. The user identification models may determine a probability that a user of the user devices 302 that identifies himself as a bona fide user of the network 100 (through such information as a username/password combination) is rather an identity thief attempting to impersonate the user to the network. The network 100 may take additional security measures in such cases to address the attempted identity fraud. The generation and application of the user identity models are described in more detail with reference to FIGS. 4A-7.

To apply communications received from the user devices 302 to the user identity models, the user identity verification device 308 may be in communication with the fraud detection server 122. The fraud detection server 122 receives the communications of the user devices 302 from the user identity verification device 38 and compares the communications to the user identification text model 312 (for text-based communications), the user identification audio model 314 (for audio-based communications), and/or the user identification object model 315 (for received objects, such as emojis and other non-text/audio items). For audio-based communications, the fraud detection server 122 may convert audio communications into a text-based input prior to providing the communications to the audio model 314. The models 312-315 may output a probability of likelihood that the communications received at the user identity verification device 308 during a communication session are not provided by the user associated with the models. For example, the models 312-315 may be created or trained with verified communications from a user to the network 100. After communications are received from a user device 302 that are associated with the user, the models 312-315 may analyze the communications and provide a likelihood probability that the user providing the communications from the user devices 302 is not the same user used to train the models 312-315. The probability output may be a binary output (e.g., the likelihood of identity fraud is greater than a threshold value) or may be a percentage or degree of likelihood of identity fraud (e.g., the percentage likelihood of identity fraud is 75%).

The user identity verification device 308 may receive the output from the fraud detection server 122 and, based on the output, provide some indication to the user identity verification device 308 of the potential identity fraud determination. For example, the user identity verification device 308 may display an alert 316 on a display indicating that a potential identity fraud situation is detected. The displayed alert may inform a service representative using the user identity verification device 308 of the potential of identity fraud 318 from the communications of the user devices 302. One or more additional security procedures may occur in response to the detection of identity fraud. For example, the user identity verification device 308 may instruct the service representative to query 320 the user devices 302 for additional identification information before the communication session may proceed. The user identity verification device 308 may terminate the communication session after detection of identity fraud during the communication session, and/or may alert a security device of the network 100 to flag other communications from the user. The communications that indicate the identity fraud may also be stored for use by the network in later identity determinations. The network 100 may also merely note the identity fraud detection, but continue with the communication session. A combination of any of the above may also be used by the network 100 in response to the detection of potential identity fraud.

Through the creation and application of the user identity models 312-315, the fraud detection system 300 may monitor communications received from user devices 302 during a communication session. The communication session may be initiated with a particular user's identity information (e.g., username/password, social security number, home address, etc.) such that models 312-315 associated with that user's previous interactions with the network 100 may be applied to the communications received during the session. The fraud detection server 122 may determine a likelihood that the user of the user devices 302 is the user identified by the identity information, or if the user providing the communications is attempting to steal the identity of a valid network user. Any number of security protocols may be executed by the network 100 in response to the detection of identity fraud during the communication session to limit or prevent additional identity fraud by the user of the user devices 302. Detection of identity fraud may prevent the stealing of services from the network 100 and/or the verified user, reducing losses in revenue and network capacity associated with those stolen services.

Figure 4:
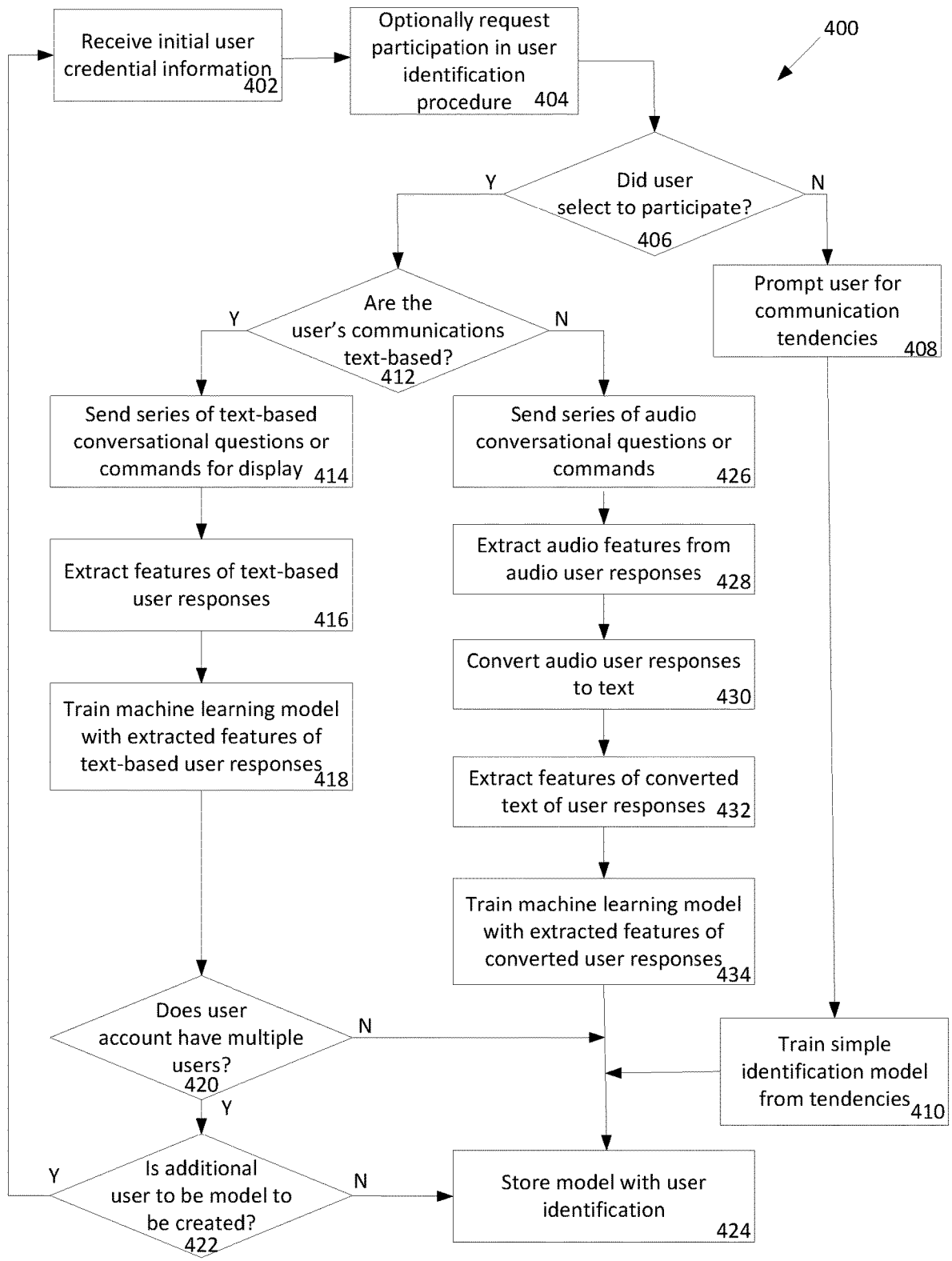
FIG. 4 is a flow chart showing an example method for training one or more user identification models from interactions with a user of a service provider for use in detecting potential identity fraud during a communication session.

FIG. 4 is a flow chart showing an example method 400 for training one or more user identification models 312-315 from interactions with a user of a service provider for use in detecting potential identity fraud during a communication session. The method 400, or one or more operations of the method, may be performed by one or more computing devices or entities. For example, portions of the method 400 may be performed by components of the network 100, such as the fraud detection server 122. The method 400 or one or more steps thereof may be embodied in computer-executable instructions that are stored in a computer-readable medium, such as a non-transitory computer readable medium. The steps in this flow chart need not all be performed in the order specified and some steps may be omitted or changed in order.

At step 402, initial user credential information from a user of the communications network 100. The initial user credential information may be provided after the user signs up for the service or otherwise initiates contact with the network to begin receiving services from or providing services to the network. The initial user credential information may include a username/password combination, social security information, date of first contact with the network to request services, etc. The initial user credential information may thus be received upon the user's initial interactions with the network 100.

In step 404, an optional request for the user's participation in the user identification procedure may be transmitted to the user device through which the user contacts the network 100. The request to opt-in to the user identification procedure may or may not be provided to the user. For example, the application of the user identification procedure may occur automatically for some or all users of the network, in which case the method 400 may continue to step 412. The request to opt-in may be provided on a display device through which the user is communicating with the network 100. For example, the user may contact the network or network administrator through a computing device, such as the laptop computer 306 or the smart phone 304 discussed above, to request services be provided to the user's residence or device. The request for the user to opt-in to the user identification procedure may be displayed on the request on the computing device used to contact the network 100. A network administrator may verbally ask the user or user to opt-in to the user identification procedure after the user contacts the network 100 over a telephone or other audio device. In step 406, the user may verbally agree to the procedure and the network administrator may initiate the identification procedure or the user may indicate the selection to participate in the user identification procedure.

If the user selects to participate in the user identification procedure, the type of communications provided by the user may be determined in step 412. For example, communications from the user may be text-based if the user is communicating with the user identity verification device 308 through a text-based chat on a computing device. In step 408, the user identity verification device 308 may determine the type of user device 302 providing the user communications. Devices such as laptop or desktop computer communicating with the user identity verification device over the Internet, may provide text-based communications. Telephonic devices, such as smartphones or tablets, may provide audio-based communications in addition to text-based communications. Identification of the type of user device 302 may comprise identifying a network address for the user device, such as a telephone number of a smartphone or a Media Access Control (MAC) address of a computing device, among other device addresses. Identification of the type of communications provided to train the models may be determined based on the type of request received at the user identity verification device 308 from the user devices 302.

Figure 5:
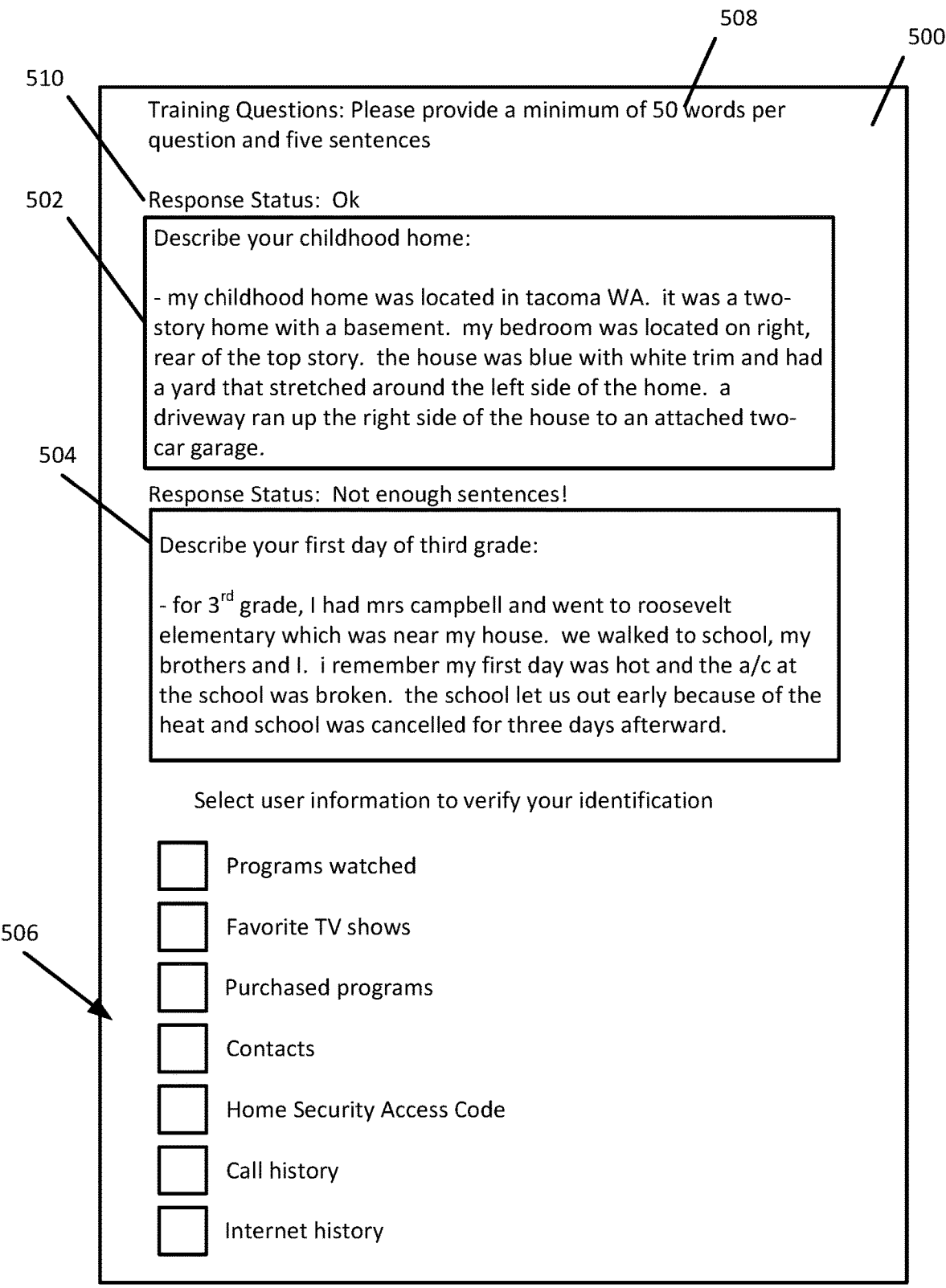
FIG. 5 is an example screenshot of a menu requesting information from a user of a service to train one or more user identification models.

If the communication is text-based, one or more text-based conversation questions or commands may be displayed on the user's device 302 in step 414. For example, FIG. 5 is a screenshot of a menu 500 requesting information from a user of a service provider to train one or more user identification models. The menu 500 may include any number of conversational questions or instructions 502-504 to the user. To obtain a texting style of the user, the instructions 502-504 may comprise commands to provide a type of narrative in a provided space in the menu itself. For example, the instructions 502-504 may include commands to describe an object (such as the user's childhood home) or an event (such as the user's first day of school in third grade). In general, any instruction, question, or command may be provided to the user's computing device 302 to obtain a narrative from the user in a general texting style of the user.

One or more requirements 506 for responding to a conversational question may be displayed on the user device as a portion of the opt-in display 500. The requirements 506 for responses may indicate a minimum number of characters, words, sentences, paragraphs, etc. that provide a nexus of author tendencies to create or train a user identification model. For example, a displayed requirement 506 for responding to the conversational questions may request at least 50 words and five sentences in the response. Any measure of input and/or combination of measure of inputs may be used. The displayed requirements 506 may also be enforced within the user display 500. For example, a status indicator 510 of a user's response to the conversational question may be displayed near the portion of the user display 500 for the user's response. The status indicator 510 may monitor the user's response and provide a current status until the minimum thresholds for the response are met. A prompt to include more words, sentences, paragraphs, etc. may also be displayed to guide the user in providing the responses to the training questions 502-504.

In addition to providing responses to questions, the user may also provide other samples of the user's writing. For example, the user may provide one or more emails to the network 100 to aid in training user identification models for the user. Similarly, SMS texts or other forms of text-based communications transmitted through the network 100 may be identified by the user for use in training the identification model 312. These additional examples of user texts may be combined with the user responses to the training questions 502-504 or may be used separately from the training questions when extracting linguistic feature of the text examples to train a user identification model 312. The user may identify such additional writing samples at the time of transmission through the network 100 for inclusion in the training responses, or may forward previously written samples to provide additional writing examples. The user display 500 may also include one or more prompts to query the use rot identify such samples and transmit the samples to the network 100.

In step 416, linguistic feature of the inputs or answers from the user in response to the conversational questions or commands may be extracted. For example, the fraud detection server 122 may utilize a natural language processing (NLP) algorithm to extract features from the user's responses, such as the frequency of white space in the user's response, the typical length of a response, the sentiment or tone of the response, the vocabulary of the response, acronyms or shortened versions of words used by the user, and the like. In general, any feature of the user's response may be extracted by the NLP algorithm for analysis by the fraud detection server 122 and inclusion in a model associated with the user.

Figure 6:
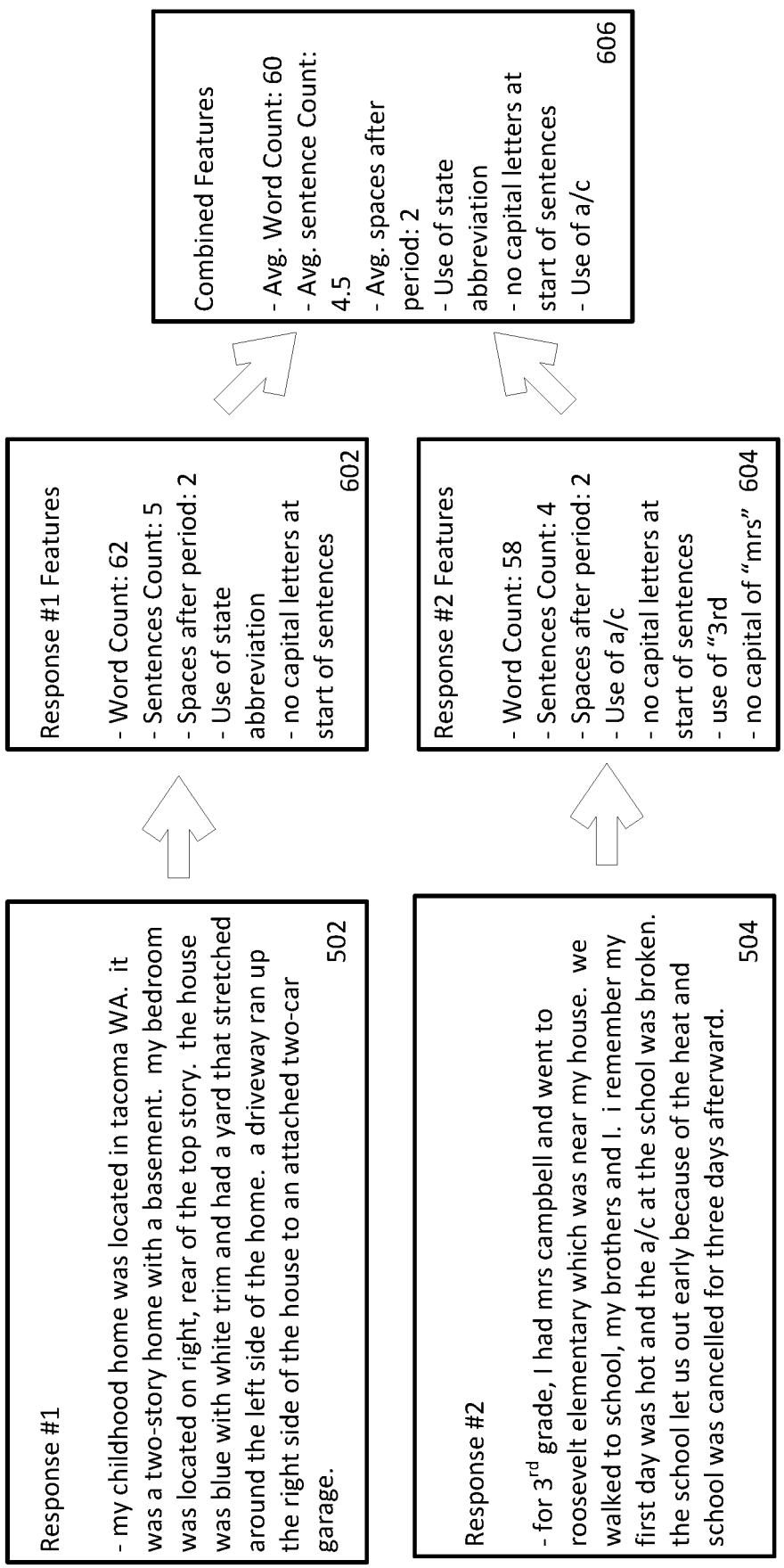
FIG. 6 is a diagram illustrating the extraction of linguistic features from responses provided by a user of a service for use in identifying potential identity fraud of the user.

FIG. 6 is a diagram illustrating the extraction of linguistic feature from responses provided by a user of a service provider for use in identifying potential identity fraud of the user. As explained in more detail below, the extracted features of the user responses may be used to train one or more user identification models. The responses 502-504 provided by the user through the opt-in display may be analyzed and one or more features may be extracted. For example, from user response 502 extracted features 602 may include a word count, a number of sentences, a number of spaces used after a period, the use of an abbreviation "WA" for the state of Washington, the lack of capital letters at the beginning of sentences, etc. These are but a few examples of features of a response that may be extracted from the provided responses. Additional features may include, but are not limited to, use of emojis, frequency and type of words used, sentence structures, abbreviations of words, use and frequency of punctuation, etc. As discussed in more detail below, features of an audio response may also be extracted, including volume, length and frequency of pauses during speech, vocabulary used, use of slang or regional dialects, etc. Features 604 of response 504 may also be extracted for use in training an identification model. The features 602 from response 502 and the features 604 from response 504 may also be combined to provide a summary of features 606 for the user. As mentioned above, any number of questions may be provided and responses received from the user. Combining the extracted features 602-604 of the provided responses from the user may be used to train an identification model for the user in detecting potential identity fraud during a subsequent communication session with the network 100.

In step 418, the extracted features from the user's responses may be used to train a machine learning model or classifier. For example, the extracted features from the user's response may be provided to a Naïve Bayes classifier or Support Vector Machine (SVM) to train the models to identify similar features in a block of text and provide an output indicating the similarity between the text used to train the model and an analyzed block of text. Once the machine learning model is trained, the model may accept an unknown portion of text and identify a likelihood that the author of the portion of text is the same author of the training text. Different models may use different extracted features from the training text and may compare an unknown text with the extracted features in different ways.

If, in step 412, the user's communications are determined to not be text-based, the network 100 may provide a series of audio conversational questions or commands to the user in step 426. For example, a user to the network 100 may use a telephone device 304 to call the user identity verification device 308. If the communications are not text-based, a series of conversational questions or commands may be displayed on the user identity verification device 308 to be asked of the user over the telephone 304. The series of conversational questions or commands may also be provided to a display device of the user's device 302 for the user to respond to over the telephone 304 to the user identity verification device 308.

In step 428, one or more audio features may be extracted from the user's audio responses to the conversational questions or commands provided to the user device 310. For example, the volume of the response, a length and frequency of pauses during speech, the vocabulary used, the use of slang or regional dialects, etc. may be extracted from the user's responses. Similar to above, the user may also provide one or more additional samples of an audio recording of the user to use in training an identification model 314, such as recorded voicemails or other audio recordings of the user. The additional samples may be transmitted over the communications network 100 or stored in a component of the network, such as a server configured to store voicemails of users of the network.

In step 430, the user's audio responses may be converted into text through one or more speech transcription algorithms that convert audio speech into text and, in step 432, one or more features of the user's responses may be extracted from the converted audio-to-text conversion. Such features may include the typical length of a response, the sentiment or tone of the response, the vocabulary of the response, acronyms or shortened versions of words used by the user, colloquialisms used by the user, types and lengths of pauses in the converted text, and the like. In step 434, one or more machine learning models may be trained with the extracted features from the converted audio responses of the user, similar to that described above. The trained model from the converted audio responses of the user may be a different trained model from the text responses of the user. Further, the converted audio-trained model may be the same or a different type of machine learning algorithm as the text-based model.

At step 420, it may be determined if multiple users are associated with an account of the network 100. For some communication networks 100, an account may be associated with a building or location, such as a user's home. Multiple users of the network 100 may use the same account to receive services from the network, such as multiple roommates or family members who reside in the same home. In such circumstances, multiple users may be included in the same network account. If there are not multiple users associated with the account of the user for which the models have been trained, the generated user identification models 312-315 for the user may be stored in step 424. The identification models 312-315 may include both text-based identification models, audio-based identification models, object-based identification models, or a combination of all types of models, depending on the examples and responses provided by the user to train the models. The models 312-315 may be stored with the user identification for use in detecting potential identity fraud of the user's information, as explained in more detail below with reference to FIG. 7. For example, the models 312-315 may be stored with a tag that identifies the user associated with the trained models for comparison with received communications that may originate with the associated user. Text-based models for users may be stored in one location separate from audio-based models and object-based models, for example, to provide faster access of the models depending on the type of communication received from a user device.

If the multiple users are associated with the account of the user, it may be determined, in step 422, if identification models for an additional user of the account is to be created. If yes, the method 400 returns to step 402 to create identification models for the additional user of the account. If no additional identification models are to be created, the generated user identification models 321-314 for the user are stored.

If the user selects to not participate in the user identification procedure as determined in step 406, a prompt may be provided to the user device 302 requesting one or more communication linguistic properties, features, or tendencies of the user in step 408, such as whether the user uses emojis or other pictographs during texting, whether the user abbreviates certain phrases ("IMHO" in place of "in my honest opinion", "k" in place of "ok", etc.), whether the user typically communicates with a smartphone or tablet device, etc. These simplified texting and/or audio features may be used in step 410 to train a simplified version of the user identification models discussed above for use in determining potential identity fraud. The simplified identification models may be stored in step 424 and used during future communications to aid in identifying potential identity fraud of the user. The simplified identification model may be given less weight or any security measures taken in response to a detected identity fraud based on the simplified identification model may be less severe, as explained in more detail below.

Figure 7:
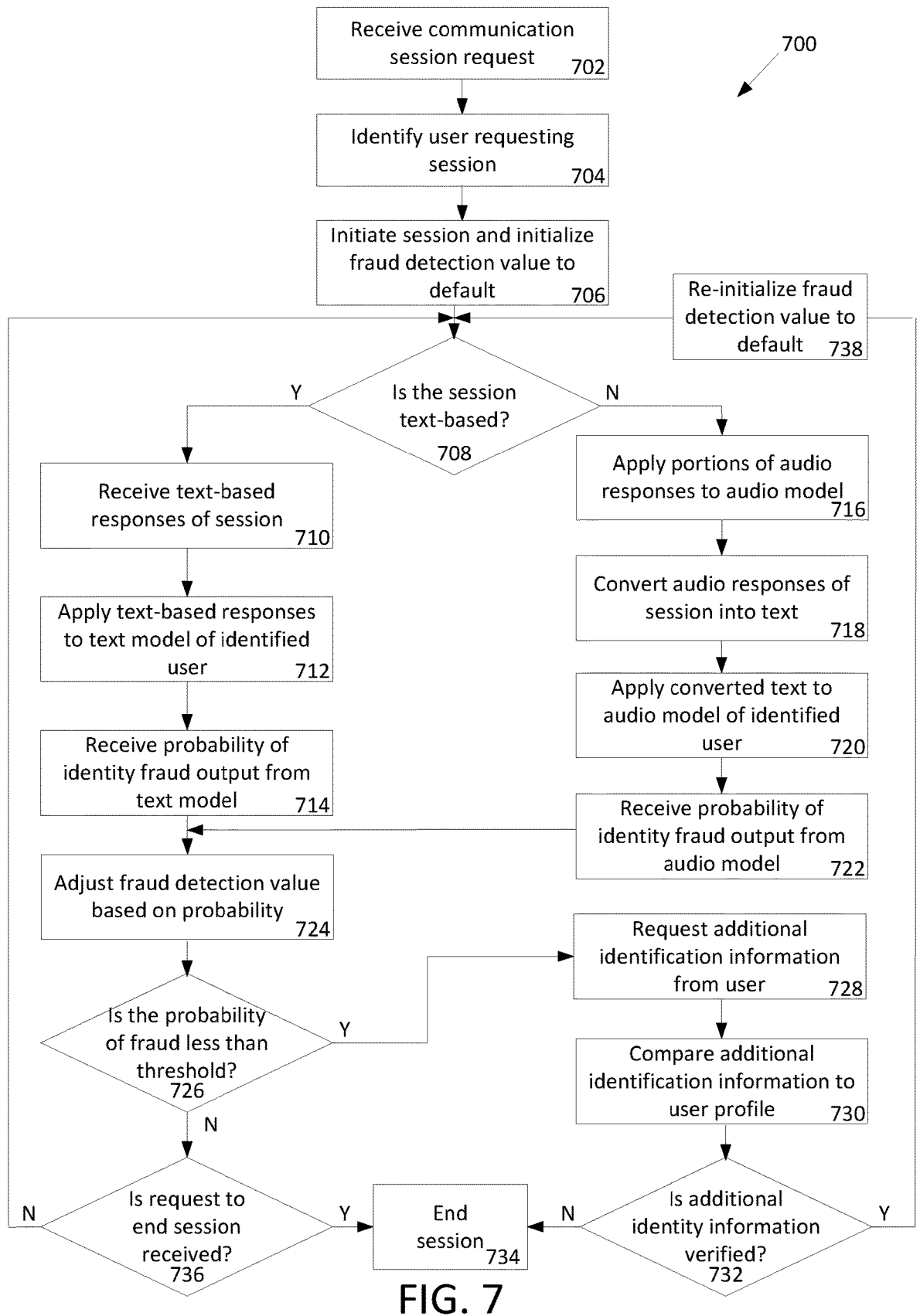
FIG. 7 is a flow chart showing an example method for applying one or more user identification models to interactions with a user of a service during a communication session to detect potential identity fraud.

FIG. 7 is a flow chart showing an example method 700 for applying one or more user identification models 312-315 to interactions with a user of a service provider during a communication session to detect potential identity fraud. The method 700, or one or more steps of the method, may be performed by one or more computing devices or entities. For example, portions of the method 700 may be performed by components of the network 100, such as the fraud detection server 122. The method 700 or one or more steps thereof may be embodied in computer-executable instructions that are stored in a computer-readable medium, such as a non-transitory computer readable medium. The steps in this flow chart need not all be performed in the order specified and some steps may be omitted or changed in order.

In step 702, a request for a communication session from a user device 302 may be received to adjust one or more services received from the network 100, including requesting the addition of one or more services. The user identity verification device 308 may provide the request or some indication of the request to the fraud detection server 122 to begin the user identification procedure. At step 704, the user requesting the communication session may be identified based on information provided associated with the request. For example, to identify the user, one or more types of identifying information may be requested and provided by the user, such as a username/password combination, account number, and the like. However, the information provided to identify the user of the request may be compromised and used to impersonate the user. For example, an unscrupulous hacker may have illegally obtained accessed a user's username and password to the network 100. The hacker may use the username/password pair to attempt to access one or more of the services provided by the network 100, request delivery of a new product or service to the hacker's location, close the user's account and request the remaining funds be delivered to the hacker's account, and the like by impersonating the user during a communication session with the network. The network 100 may use the user identification models 312-315 associated with the impersonated user to identify that the hacker is attempting to impersonate the user. The models may provide a probability that the identified user being impersonated is the author of communications provided by the user device 302. If the probability that the communications is authored by the identified user is low, the network 100 may assume that a hacker is attempting to impersonate the user and apply one or more security steps to address the determine identity fraud.

In step 702, the identity of the user may also be determined from information received from the user device 302 from which the communication session is requested. For example, the user identity verification device 308 may receive a request for a communication session from a smart phone 304 or other telephonic device. The request may include a telephone number associated with the user device 304. The user identity verification device 308 or other component of the network 100 may access a database of user information to associate the telephone number of the user device 304 with a particular user of the network. Requests received from computing devices, such as computing device 306, may include a network address (such as an Internet Protocol (IP) address) associated with the computing device. The user identity verification device 308 or other network 100 component may compare the network address of the computing device 306 to a database of such addresses to associate the IP address with a user of the network. This may aid the network 100 in identifying a user of the network 100 requesting a communication session with the user identity verification device 308.

At step 706, the communication session may be initiated with the fraud detection procedure. The fraud detection procedure may initialize a fraud detection value or percentage to a default value. The default value may be any value, such as 100% or 1.0. The fraud detection value provides an indication of the likelihood of identity fraud during the communication session. Thus, if the hacker succeeds in entering the correct password for a user's account, the hacker's conversation may continue in step 708, but the session may be continuously monitored for linguistic abnormalities in view of the user's profile of expected communication patterns. During the procedure, inputs or responses received from the user device 302 may be provided to the fraud detection sever 122 and, through the use of the identification models 312-315, an estimated likelihood of identity fraud by the hacker may be determined. Step 708 begins a looping process that may loop through the responses provided by the user device 302 to verify that the responses are provided by the user, or to detect when the responses do not match the trained models of the user 312-314. The initial fraud detection value may be set at 100% based on an assumption by the network 100 that the user providing the password is the proper user of the network and not the hacker.

At step 708, the fraud detection server 122 determines whether the communication session is text-based. A text-based communication session may include an online chat session between the user device (such as the user smart phone 304 or the user laptop 306) and the user identity verification device 308. If the communication session is text-based, one or more text-based responses from the user device 302 during the communication session may be received in step 710, such as requests to add services, responses to queries about the services being requested or already provided, and the like. A response may be a block of text that is sent from the user device 302, such as when a user (or impersonator) submits the response to the sent to the user identity verification device 308. At step 712, the text-based responses may be provided to the text model 312 associated with the identified user. As mentioned above, the text model 312 may provide an output of the likelihood or probability that a block of text is provided by the same author as used to train the model. The output of the text model 312 may include a binary response that indicates that it is more likely than not that the author is the same. The output of the text model 312 may also include a probability value, such as a confidence percentage, that the author is the same. For example, the output of the text model 312 may provide an indication that there is a 75% likelihood that the author is the same.

In step 724, the fraud detection value may be adjusted based on the output of the identification model 312. For example, the user identification model may provide a 70% probability that the user response was authored by the identified user. The initial fraud detection value may be adjusted down based on that model probability output. For example, an average of the initial probability (100%) and the output probability (70%) may be calculated (85%) and the fraud detection value may be set at the calculated average. In this manner, the fraud detection value may be a running total of outputs from the identification models. As more and more responses are received from the user device 302 that are suspect or otherwise identified as not likely to be from the identified user, the fraud detection value may be adjusted lower. Responses that are determined as being likely authored by the identified user may raise the fraud detection value. Other adjustments to the fraud detection value may also be used, such as setting the fraud detection value as the last probability output as determined by the fraud detection server 122, providing varying weights to the probability outputs based on a size or length of a response before adjusting the fraud detection value (a shorter response such as "yes" may be given a lower weight than a longer response), adjusting the fraud detection value greater for particular types of responses (the probability output of the text-based user identification model 312 may adjust the fraud detection value greater than the probability output of the audio-based user identification model 314), and the like.

In step 708, the communication session may be determined to not be text-based, such as an audio telephone call to the user identity verification device 308. In such cases, portions of the audio response may be provided to the audio-based user identification model 314 in step 716. The audio-based user identification model 314 may detect audible cues in the response, such as voice patterns, types and lengths of pauses, volume, inflection, etc. and determine the likelihood that the identified user provided the audio response. In step 718, the audio responses received from the user device 302 during the communication session may be converted into text using one or more audio-to-text conversion algorithms. At step 720, the converted text may be provided as an input to the stored audio model 314 associated with the user. At step 722, the output from the audio-based identification model 314 may be received indicating the likelihood or probability that a block of the converted text is provided by the same author as used to train the model. Similar to the text model 312, the output of the audio model 314 may include a binary response that indicates that it is more likely than not that the author is the same. The output of the audio model 314 may also include a probability value, such as a confidence percentage, that the author is the same. This output may be used in step 724 to adjust the fraud detection value as described above.

Although discussed above as using the text model 312 or the audio model 314, any model associated with a user may be used, either alone or in combination, to determine a probability of fraud value. For example, a combination of the text model 312 and the object model 315 may be used to determine the fraud detection value. The output from the text model 312 may be combined with the output of the object model 315, in one example, and an average fraud value may be determined. In another example, fraud detection values from each stored model 312-315 may be determined for a received communication and the highest determined fraud value from the models may be used by the system as the fraud detection value or probability. In another example, the lowest fraud detection value from the models 312-315 associated with the user may be used by the system. Any combination of the stored models and the determined fraud detection values from the stored models may thus be used to determine the fraud detection value or probability.

At step 726, the fraud detection value may be compared to a threshold value to determine if the fraud detection value is less than the threshold value. The threshold value may be set at any probability, such as 25%, 10%, 5% etc. The fraud detection value may provide an indication of the probability that an impersonator is providing the responses during the session if the value is less than the threshold value. The threshold value may also change depending on several factors, including the types of communications sent or the topic of the session. For example, if the user is asking for technical help with the network, the threshold value may be set at a low value (such as 5%) as the network 100 may be less concerned about potential identity fraud. However, if the user is requesting setting up new services or receiving some monetary value, the threshold value may be set a higher value (such as 50%) to add security features for certain service requests. Analysis of the request and communications received from the user during the session may provide an indication of the session topic, such as use of words "refund" or "add service" in the request and responses. Occurrence of these trigger words in the request or responses may adjust the threshold value during the session.

If the fraud detection value does not drop below the threshold value during the session, it may be determined if a request to end the communication session is received at step 736. If a request to end the communication session is received, the communication session may be ended at step 734. If the request to end the communication session is not received, the communications received from the user device 302 during the session may continue to be monitored for potential identity fraud by returning to step 708. Additionally received communications during the session may be analyzed through the user identification models 312-315 and the fraud detection value for the session may be adjusted accordingly.

If the fraud detection value drops below the threshold value in step 726, the user of the communication session may be identified as a potential impersonator and additional security measures may be initiated by the fraud detection server 122 or the user identity verification device 308. The additional security measures may include requesting additional identification information from the user of the communication session at step 724. Such additional identification information may include user activities with the network 100 included in the user profile associated with the identified user. For example, the user activities with the network 100 that may be used to verify the user's identity may include the names of programs watched or received from the network, the names of programs noted as favorites of the user, the names and dates of programs purchased from the network (such as recent pay-per-view items), television or other programs scheduled to record on a recording device associated with the user, names of contacts included in the user's cell phone, recent telephone usage such as calls made and/or calls received, a home security access or identification code, recent home security activities (time and location of identification code inputs), a telephone call history with the communications network, an Internet history of a user device connected to the network, etc. As explained in more detail below, any activity of the user on the network 100 may be obtained and stored in a user profile associated with the user. This additional identification information included in the user profile may be activities of the user with the network 100 such that a hacker who obtains the user's password might not be privy to and may have difficulty verifying. An example alert 318 displayed on a display of a user identity verification device 308 is illustrated in FIG. 3. The alert 318 may indicate that additional identification information may be requested of the user of the communication session and a link 320 to access the additional questions to verify the identity of the user may be provided.

At step 730, the additional identification information received from the user device 302 may be compared to the user profile associated with the user to verify the accuracy of the additional identification information. Any received additional identification information may be applied to the user profile. For example, the additional identification information may indicate one or more favorite shows indicated by the user during interactions with the communications network 100. Such information may be included in the user profile of the user such that a comparison of the additional identification information to the user profile may verify the user's identity. More recent user activities with the network 100 may be selected as the additional identification information used to verify the user's identity as that information is more likely to be remembered by the user and may be more secure from hackers. Current activities with the network 100, such as currently viewed programs, may also be used as the additional identification information. The additional identification information may also include a second device verification. For example, the alert 318 to obtain the additional identification information may include an instruction to the user to access a television or other display connected to the network 100 and repeat back a verification code or provide a particular input to the display through an input device.

As shown in FIG. 5, the user may select which additional identification information may be used to verify the identity of the user. For example, as part of the request for the user's participation in the user identification models in step 404, the displayed menu 500 may include a listing 506 of types of user profile information that may be used to aid in identifying the user. For example, the menu 500 may include a query to the user to identify user information from a list 506 of user interactions with the network 100 to be used to identify the user. The list 506 may include the names of programs watched or received from the network 100, the names of programs noted as favorites of the user, the names and dates of programs purchased from the network, names of contacts included in the user's cell phone, a home security access or identification code, a telephone call history with the communications network, an Internet history of a user device connected to the network, etc. A user may select one or more of the items in the list 506 of user profile information to be used by the fraud detection server 122 to identify the user. The selected items may thus be used as the additional identification information that is asked of the user when identity fraud of the user is suspected based on the fraud detection value discussed above.

At step 732, the additional identification information may be verified. If verified, the fraud detection value may be re-initialized to the default value in step 738 and monitoring of the communications received from the user devices 302 during the session may continue to be monitored for identity fraud in step 708. Verification of the additional identification information may also end the user identification procedure such that no additional analysis of the user's responses is analyzed for the session. If the additional identification information is not verified against the user profile, the communication session may be flagged as including a potential identity fraud and termination of the communication session may occur at step 734. Additional security measures may also be performed if a potential identity fraud is determined, such as noting the identity fraud attempt in a log or file associated with the user, alerting one or more security systems to the attempt, halting one or more services of the user until the user's identification can be verified, etc.

Figure 8:
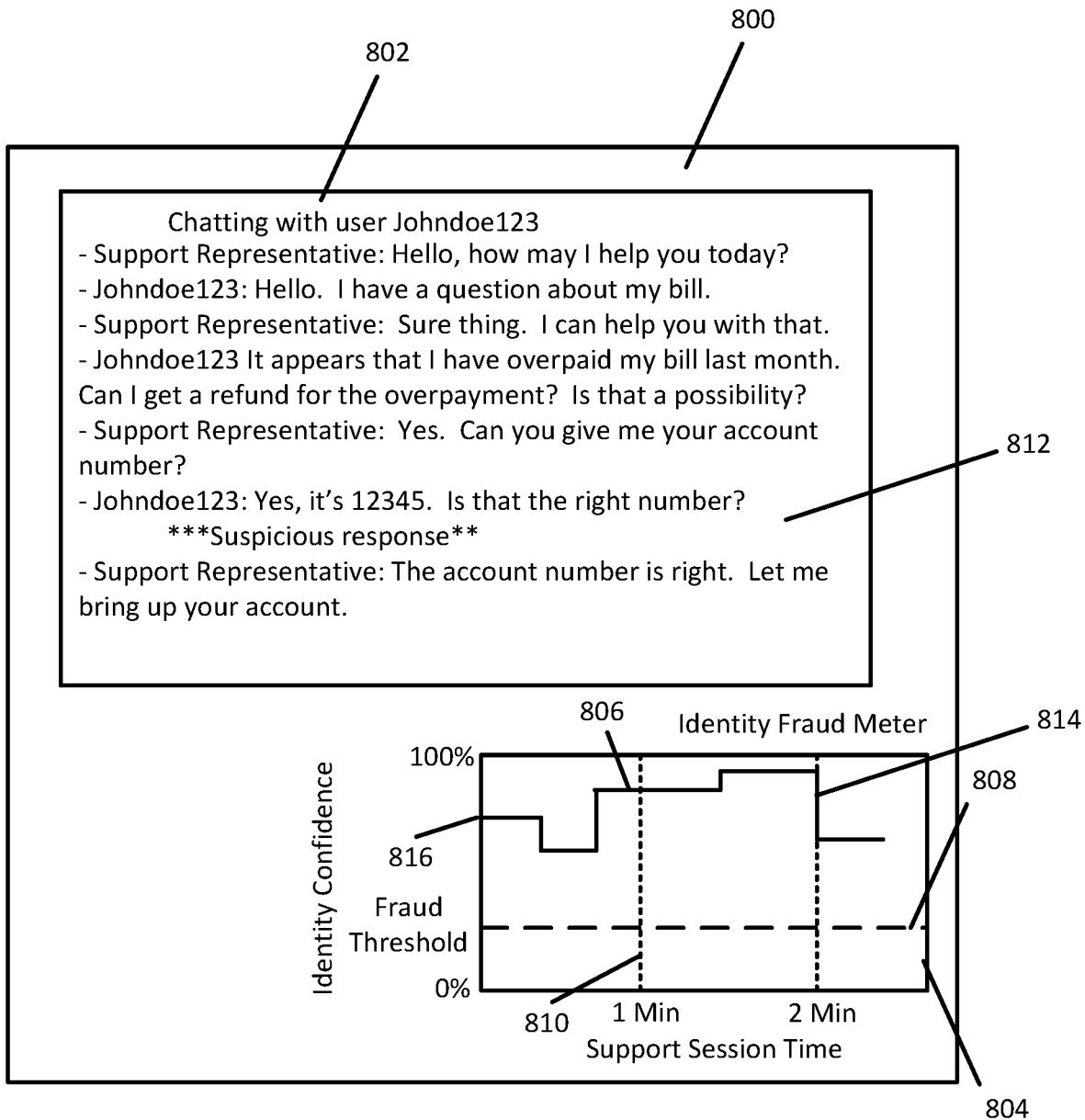
FIG. 8 is an example screenshot of a user identity verification device illustrating an output from one or more user identification models tracking a probability of identity fraud over a period of time of a communication session.

FIG. 8 is an example display 800 of a user identity verification device 308 illustrating an output from one or more user identification models 321-314 tracking a probability of identity fraud over a period of time during a communication session. The display 800 may be displayed to a customer service technician or network administrator of the communications network 100 during a service session. The output from the identification model for a user of the network 100 may be provided to the display of the user identity verification device 308 during a communication session to provide an identification aid to the network administrator. Although a text-based chat session is illustrated, a similar illustration of the output from the identification model for the user may be provided for audio-based communication sessions.

In the display 800, a chat portion 802 of the display may be provided that illustrates the communications between the user identity verification device 308 and the user device 302 engaged in the communication session. The chat portions 802 may include communications entered into either the user device 302, the user identity verification device 308, or both. The display 800 may also include a graph of an output from the identification model for the user of the user device 308 as described above. For example, a user of the network 100 may initiate a communication session with the user identity verification device 308 and provide initial identification information. This information may be used by the fraud detection server 122 to obtain an identification model 312 associated with the user. During the communication session, the communications received from the user device 302 may be provided to the identification model 312 and an output from the model may be received. The output from the identification model 312 may include a percentage value of confidence that the author of a block of text from the user device 302 is the same as the author used to train the identification model. For example, the identification model 312 may output an 85% confidence that the author is the same. This percentage value may be combined with an initial fraud detection value to obtain a running fraud detection value for the session. Additional blocks of text received from the user device 302 during the communication session may also be provided to the identification model 312 and the fraud detection value may be adjusted based on the additional probabilities. The history of the output of the identification model 312 during the communication session may be displayed in an identity fraud meter 804, illustrated in FIG. 8.

The identity fraud meter 804 may be displayed in the display 800 of the user identity verification device 308. The identity fraud meter 804 may be a line graph that graphs the fraud detection value 806 for the session (shown on the x-axis of the graph) over the duration of the communication session (shown on the y-axis of the graph). Initially, the fraud detection value 806 may be set at default value 816. As the output 806 from the identification models 312-315 are received, the fraud detection value 806 may be adjusted and graphed in the fraud detection meter 804 for reference during the communication session. Markers 810 illustrating the duration of the communication session may also be displayed in the identity fraud meter 804, illustrated in FIG. 8 as hashed vertical lines at every minute of the session. Drops in the confidence that the user is providing the responses (such as at time 814) may be illustrated in the identity fraud meter 804 that coincide with responses provided by the user that are indicated as being potentially from an impersonator by the user identification models 312-315. An indication of such suspicious statements may also be illustrated in the chat box for the session, such as at line 812. Additional responses provided by the user may improve the fraud detection value for the session and cause the meter 806 to increase.

Through the identity fraud meter 804, the user identity verification device 308 may display the fraud detection value 806 associated with the communication session. A user of the user identity verification device 308 may reference the identity fraud meter 804 and initiate one or more security procedures based on the information displayed in the meter. For example, a user of the user identity verification device 308 may observe that the fraud detection value indicates a low confidence of the user's identity and may take extra steps to verify the user's identity, such as providing additional security questions to the user device 302. The identity fraud meter 804 may include an illustrated threshold value 808. The threshold value 808 may be any value that the fraud detection value satisfies to trigger one or more additional security measures. A user of the user identity verification device 308 may visually verify the fraud detection value 806 for the session has dropped below the threshold value 808 and may initiate the additional security measures or such measures may occur automatically after the fraud detection value dropping below the threshold value. Regardless of the actions performed based on fraud detection value, the identity fraud meter 804 may provide a display of the fraud detection value over time during a communication session with a user device 302 to aid the user identity verification device 308 and/or the fraud detection server 122 in determining the likelihood of identity fraud of a user of the network 100. This identification may reduce cost and bandwidth of the communications network 100 to improve the operation of the network.

Figure 9:
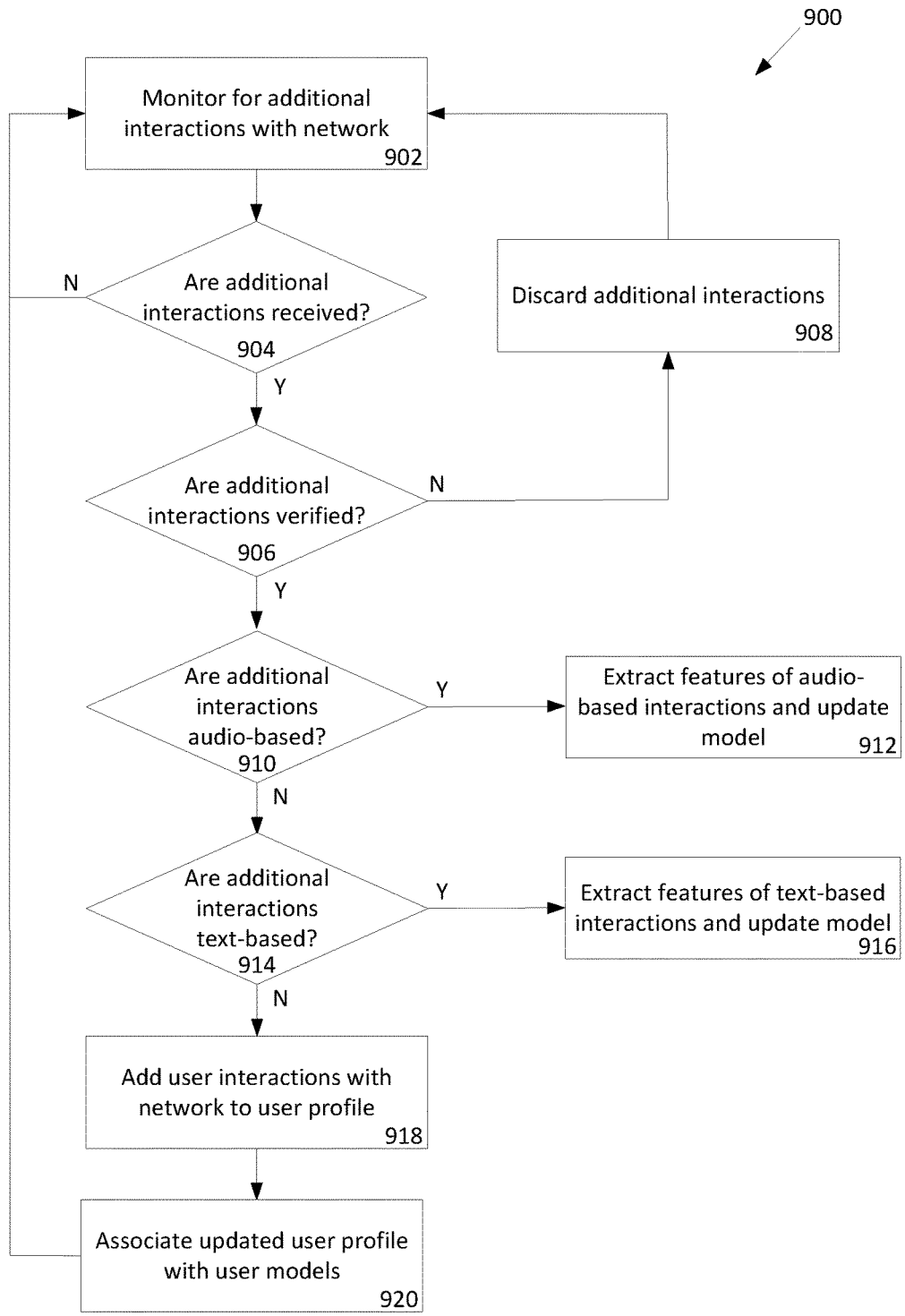
FIG. 9 is a flow chart showing an example method for updating one or more user identification models from interactions with a user of a service for use in detecting potential identity fraud during a communication session.

The identification models 312-315 for a user to the network 100 may be updated or refined with additional interactions with the user. For example, additional communications from the user and the network 100 may similarly be analyzed to extract linguistic feature and the identification models 312-315 updated with the extracted properties to improve the accuracy of the models to identify the user associated with the models. FIG. 9 is a flow chart showing an example method 900 for updating one or more user identification models from interactions with a user of a service provider for use in detecting potential identity fraud during a communication session. The method 900, or one or more steps of the method, may be performed by one or more computing devices or entities. For example, portions of the method 900 may be performed by components of the network 100, such as the fraud detection server 122. The method 900 or one or more steps thereof may be embodied in computer-executable instructions that are stored in a computer-readable medium, such as a non-transitory computer readable medium. The steps in this flow chart need not all be performed in the order specified and some steps may be omitted or changed in order.

Users of a communication network 100 may interact with that network many times during the time in which the network provides services to the user. For example, the user may request and view television programs provided by the network, may use the network to place and receive telephone calls, may use the network to request and receive online content displayed in a web browser. The user may also contact the network 100 or an administrator of the network from time to time to adjust the services provided, pay a bill, request information about the services, etc. These additional interactions with the network 100 during the time the user is receiving services from the network may be used to update the user identification models 312-315 associated with the user to make the models more accurate and/or adjust the models to new texting and verbal tendencies adopted by the user over time. To update the user identification models 312-315, additional interactions with the network 100 by the user may be monitored for in step 902. Such interactions may include additional communication sessions, interactions with the user and a service provided by the network 100 (such as inputs provided by a remote control during viewing of content items, cellular phone usage, internet usage and websites visited, etc.). At step 904, the network 100 may determine if additional interactions between the user and the network are received and, if not, may return to monitoring for additional interactions from the user in step 902.

If additional interactions are received and to prevent an update to the identification model 312-314 for a user that includes false information or interactions that are not from the user associated with the identification model, the fraud detection server 122 or other network component may determine if the additional interactions are verified interactions from the user. To verify that the additional interactions are from the identified user, the additional interactions may be provided to the previously stored identification models 312-315 of the fraud detection server 122 to determine the likelihood or probability that the additional interactions are from the identified user. If the fraud detection server 122 determines the additional interactions are likely from the identified user (such as if the likelihood exceeds a threshold value), the interactions may be verified. The fraud detection server 122 may also determine a source of the additional interactions (such as from a telephone number, a MAC address, originating from a geographic location, etc.) and verify the additional interactions if the source is associated with the identified user. For example, a telephone number associated with the user may be used to provide the additional interactions such that the interactions may be verified. The fraud detection server 122 may also verify the additional interactions based on a number and type of user identification information received associated with the additional interactions, such as a username/password, social security number, account number, etc. If the additional interactions are not verified in step 906, the additional interactions may be discarded in step 908 so as not to adjust or update the stored identification models 312-315 with the additional interactions. Continual monitoring for additional interactions from the user may occur again at step 902. Approval for use of an additional interaction to update a user identification model 312-314 may also be requested and/or received from the user. For example, after a telephone call between the user and the network 100, the user may be prompted to approve the use of the interaction to update the audio identification model 314 with the conversation. A similar prompt may follow a text communication, a purchase of a pay-per-view program, an addition of a service, etc.

If the additional interactions are verified for use in updated the user identification models 312-315, the additional interactions may be determined to be audio-based interactions in step 910. If the additional interactions are audio-based, audio responses may be used to update the audio-based identification model 314 for the user in step 912. The updating of the audio identification model 314 may include similar steps as described above in training the model, such as extracting linguistic audio properties or features from the audio responses and/or converted audio responses and training of the model with the extracted features. For example, a user may provide additional interactions with communications network 100 over time and as the user ages. The difference in the user's vocabulary and manner of speech as the user ages may be gathered and used to refine or alter the audio-based identification model 314 to keep the model up to date with the user. Changes in phrases used by the user over time may also be captured and applied to the audio-based model so that the model is relevant to the user's current state.

If the additional interactions are determined to not be audio-based, the additional interactions may be determined to be text-based interactions in step 914. If the additional interactions are text-based, linguistic feature of the text-based interaction may be extracted and used to update the text-based model 312 with the additional interactions from the user associated with the stored text model in step 916. If the additional interactions are determined to not be text-based, additional user interactions with the network 100 may be added to the user profile associated with the user in step 918.

As mentioned above, users of the network 100 may have an associated user profile. One or more of the identification models 312-315 for the user of the network 100 may be also associated with the user profile. The user profile may include interactions between the user and the network 100 not received during a communication session, such as inputs received at the network to view a television program or movie, telephone number and duration of calls received from a cell phone device, building security information, websites visited or accessed through an internet connection, and the like. Verification of the user profile interactions may include verifying the device receiving the interactions is associated with the user, determining that a username or password is associated with the user interactions, verifying payment information associated with an interaction, and the like. In step 920, the updated user profile may be associated with the user identification models 312-315 (for verifying additional user identification information discussed above) and the network 100 may return to step 902 to monitor for additional interactions from the user to update the user identification models 312-315 and/or the user profile.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   receiving, by a computing device and from a user device, a communication in a communication session;
   determining, based on one or more previous communications in the communication session, a fraud detection value of the communication session, wherein the fraud detection value of the communication session indicates a likelihood of identity fraud during the communication session;
   determining, based on the communication and an average sentence length in text associated with a user, an author confidence value of the communication, wherein the author confidence value of the communication indicates a likelihood that the user caused the user device to provide the communication;
   adjusting, based on the author confidence value of the communication, the fraud detection value of the communication session; and
   requesting, based on the adjusted fraud detection value of the communication session and from the user device, additional identification information.

2. The method of claim 1, wherein the determining the author confidence value comprises:
   determining an average sentence length in the communication;
   comparing the average sentence length in the communication with the average sentence length in the text associated with the user; and
   determining the author confidence value based on the comparison.

3. The method of claim 1, wherein the text associated with the user comprises at least one of an email, a text message, a writing sample, or a user response.

4. The method of claim 1, further comprising:
   receiving, from the user device, the additional identification information; and
   terminating, based on the author confidence value and the additional identification information, the communication session.

5. The method of claim 1, wherein the determining the author confidence value is further based on at least one of:
   a frequency of one or more punctuations in the text,
   a frequency of one or more abbreviated words in the text,
   a word count in the text,
   a quantity of sentences in the text,
   a quantity of spaces used after a period in the text, or
   absence of a capital letter at a beginning of a sentence in the text.

6. The method of claim 1, wherein the additional identification information comprises a verification of a previous interaction by the user with the user device.

7. The method of claim 1, wherein the additional identification information comprises a media access control address associated with the user device.

8. The method of claim 1, wherein the adjusting the fraud detection value comprises determining an average value based on the author confidence value and the fraud detection value.

9. The method of claim 1, wherein the adjusting the fraud detection value comprises applying, to the author confidence value, a weight value that corresponds to a length of the communication.

10. The method of claim 1, wherein the adjusting the fraud detection value comprises applying, to the author confidence value, a weight value based on whether the communication is text-based or audio-based.

11. A method comprising:
    receiving, by a computing device and from a user device, a communication in a communication session;
    determining, based on one or more previous communications in the communication session, a fraud detection value of the communication session, wherein the fraud detection value of the communication session indicates a likelihood of identity fraud during the communication session;
    determining, based on the communication and a frequency of one or more punctuations in text associated with a user, an author confidence value of the communication, wherein the author confidence value of the communication indicates a likelihood that the user caused the user device to provide the communication;
    adjusting, based on the author confidence value of the communication, the fraud detection value of the communication session; and
    requesting, based on the adjusted fraud detection value of the communication session and from the user device, additional identification information.

12. The method of claim 11, wherein the determining the author confidence value comprises:
    determining a frequency of the one or more punctuations in the communication;
    comparing the frequency of the one or more punctuations in the communication with the frequency of the one or more punctuations in the text associated with the user; and
    determining the author confidence value based on the comparison.

13. The method of claim 12, wherein the determining the author confidence value is further based on at least one of:
    an average sentence length in the text,
    a frequency of one or more abbreviated words in the text,
    a word count in the text,
    a quantity of sentences in the text,
    a quantity of spaces used after a period in the text, or
    absence of a capital letter at a beginning of a sentence in the text.

14. The method of claim 12, wherein the additional identification information comprises a verification of a previous interaction by the user with the user device.

15. The method of claim 12, wherein the additional identification information comprises a media access control address associated with the user device.

16. The method of claim 11, wherein the text associated with the user comprises at least one of an email, a text message, a writing sample, or a user response.

17. The method of claim 11, further comprising:
receiving, from the user device, the additional identification information; and
terminating, based on the author confidence value and the additional identification information, the communication session.

18. A method comprising:
receiving, by a computing device and from a user device, a communication in a communication session;
determining, based on one or more previous communications in the communication session, a fraud detection value of the communication session, wherein the fraud detection value of the communication session indicates a likelihood of identity fraud during the communication session;
determining, based on the communication and a frequency of one or more abbreviated words in text associated with a user, an author confidence value of the communication, wherein the author confidence value of the communication indicates a likelihood that the user caused the user device to provide the communication;
adjusting, based on the author confidence value of the communication, the fraud detection value of the communication session; and
requesting, based on the adjusted fraud detection value of the communication session and from the user device, additional identification information.

19. The method of claim 18, wherein the determining the author confidence value comprises:
determining a frequency of the one or more abbreviated words in the communication;
comparing the frequency of the one or more abbreviated words in the communication with the frequency of the one or more abbreviated words in the text associated with the user; and
determining the author confidence value based on the comparison.

20. The method of claim 18, wherein the text associated with the user comprises at least one of an email, a text message, a writing sample, or a user response.

21. The method of claim 18, further comprising:
receiving, from the user device, the additional identification information; and
terminating, based on the author confidence value and the additional identification information, the communication session.

22. The method of claim 18, wherein the determining the author confidence value is further based on at least one of:
an average sentence length in the text,
a frequency of one or more punctuations in the text,
a word count in the text,
a quantity of sentences in the text,
a quantity of spaces used after a period in the text, or
absence of a capital letter at a beginning of a sentence in the text.

23. The method of claim 18, wherein the additional identification information comprises a verification of a previous interaction by the user with the user device.

24. The method of claim 18, wherein the additional identification information comprises a media access control address associated with the user device.

* * * * *

UNITED STATES PATENT AND TRADEMARK OFFICE
CERTIFICATE OF CORRECTION

PATENT NO. : 11,966,493 B2
APPLICATION NO. : 17/527232
DATED : April 23, 2024
INVENTOR(S) : Van Antwerp et al.

Page 1 of 1

It is certified that error appears in the above-identified patent and that said Letters Patent is hereby corrected as shown below:

In the Specification

Column 4, Line 2:
Delete "Protocol VoIP" and insert --Protocol—VoIP--

Column 7, Line 21:
Delete "38" and insert --308--

Column 11, Line 27:
Delete "310." and insert --302.--

Column 12, Line 24:
Delete "321-314" and insert --312-315--

Column 13, Lines 32-33:
Delete "user device 304." and insert --smart phone 304.--

Column 13, Lines 35-36:
Delete "user device 304" and insert --smart phone 304--

Column 13, Line 60:
Delete "sever" and insert --server--

Column 17, Line 41:
Delete "321-314" and insert --312-315--

Column 17, Line 62:
Delete "308" and insert --302--

Signed and Sealed this
Ninth Day of December, 2025

John A. Squires
*Director of the United States Patent and Trademark Office*